(12) United States Patent
McFarland

(10) Patent No.: US 6,382,255 B2
(45) Date of Patent: May 7, 2002

(54) CHECK VALVES

(75) Inventor: Stanley McFarland, Bangor (GB)

(73) Assignee: Munster Simms Engineering Limited, Bangor (GB)

( * ) Notice: Subject to any disclaimer, the term of this patent is extended or adjusted under 35 U.S.C. 154(b) by 0 days.

(21) Appl. No.: 09/885,016

(22) Filed: Jun. 21, 2001

(30) Foreign Application Priority Data

Jun. 21, 2000 (GB) .............................................. 0015146

(51) Int. Cl.⁷ .............................................. F16K 15/14
(52) U.S. Cl. ..................................................... 137/849
(58) Field of Search ................................ 137/849, 846, 137/847

(56) References Cited

U.S. PATENT DOCUMENTS 4,492,253 A * 1/1985 Raftis .......................... 137/849
5,443,452 A * 8/1995 Hart et al. ............... 137/849 X

* cited by examiner

Primary Examiner—Kevin Lee
(74) Attorney, Agent, or Firm—Ronald E. Greigg

(57) ABSTRACT

A check valve comprises a body of elastomeric material having a tubular inlet at a first end with a radial flange. The body has a side surround with three equi-spaced valleys tapering together towards a second end opposite to the first end and having thereat sealing edges in the form of a triskelion. An openable mouth is extendible between said sealing edges of substantially the same areal dimensions as the tubular inlet.

15 Claims, 3 Drawing Sheets

CHECK VALVES

BACKGROUND OF THE INVENTION

1. Field of the Invention

This invention relates to a check valve for use primarily, but not essentially, in a toilet assembly particularly, but not necessarily, of the type installed in land or water recreational vehicles, for example motorhomes or boats respectively.

2. Brief Description of the Prior Art

A requirement of a check valve of the type with which this invention is concerned provided in an assembly, is to open to allow passage of waste material and thereafter to close to prevent re-entry of waste material or of any smell or gases deriving from such waste material. It has been proposed heretofore that such a check valve be a duckbill valve having a body of elastomeric material having a tubular inlet portion at a first end with a radial flange and a circumferential shoulder, the body having opposed side walls tapering towards each other to terminate in sealing edges at a second end, opposite to the first end. The sealing edges lie in a plane diametrical of the tubular inlet portion. A duckbill valve of this type is disclosed in U.S. Pat. No. 5,063,619.

A problem with such duckbill valves is the limitations on the quantity and diametrical size of material that can pass through the mouth of the valve when open by deflection apart of the sealing edges during a 'flushing' operation.

SUMMARY OF THE INVENTION

An object of the present invention is to provide a check valve in which such problem is obviated or mitigated.

Accordingly, the present invention is a check valve comprising a body of elastomeric material having a tubular inlet at a first end with a radial flange, the body having a side surround with three equi-spaced valleys tapering towards a second end opposite to the first end and having thereat sealing edges in the form of a triskelion, whereby an openable mouth is extendible between said sealing edges of substantially the same areal or cross sectional dimensions as the tubular inlet.

Preferably, each arm of the triskelion is of the same length and has a slit substantially median of its width, and the slits in the arms unite together at adjacent ends.

Preferably also, the wall thickness of the valley sides is greater than the wall thickness of the side surround. At the bottom of each valley, a groove is beneficially positioned to provide a flexing line. The wall thickness of the bottom of the groove is desirably less than the wall thickness of the valley sides.

BRIEF DESCRIPTION OF THE DRAWINGS

An embodiment of the present invention will be described hereinbelow, by way of example, with reference to the accompanying drawings, in which.

DESCRIPTION OF THE PREFERRED EMBODIMENTS

Figure 2:
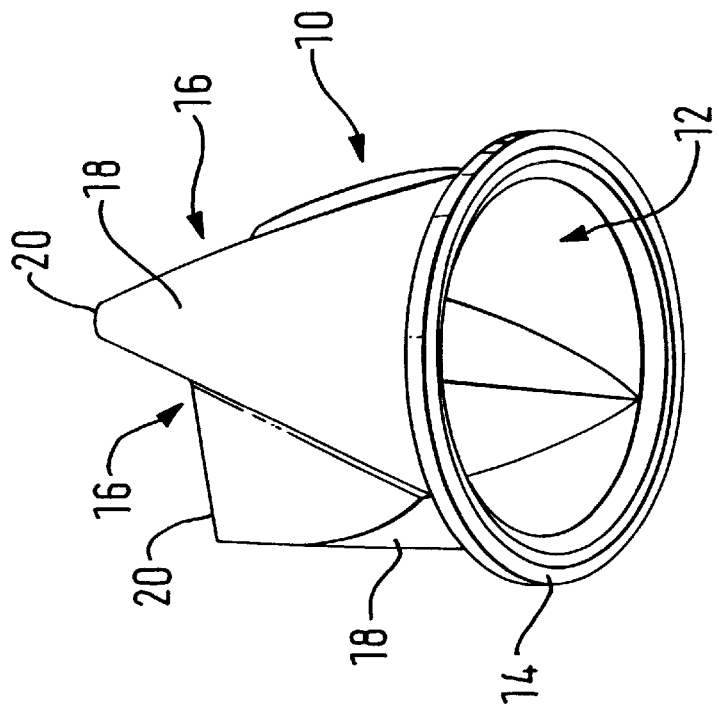
FIG. 2 is a second perspective view from below of the check valve.
Figure 1:
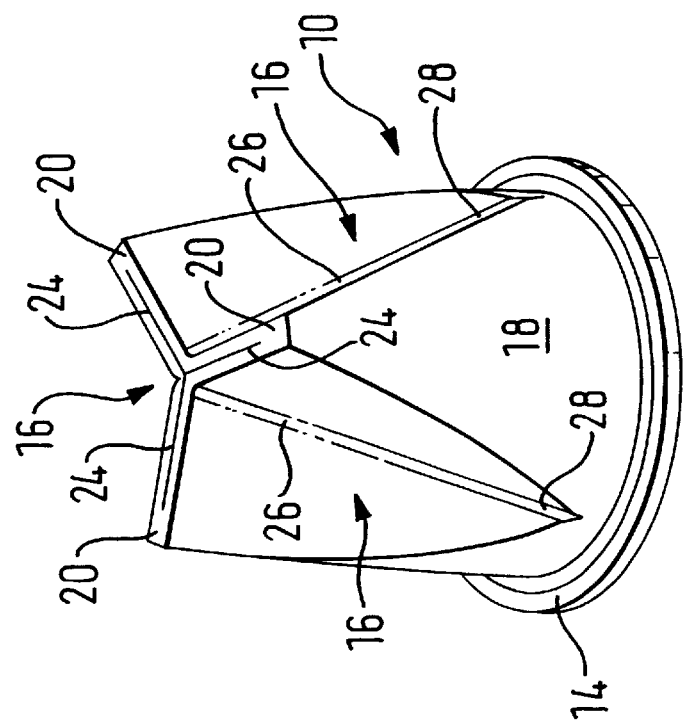
FIG. 1 is a first perspective view from above of a check valve according to the present invention.
Figure 4:
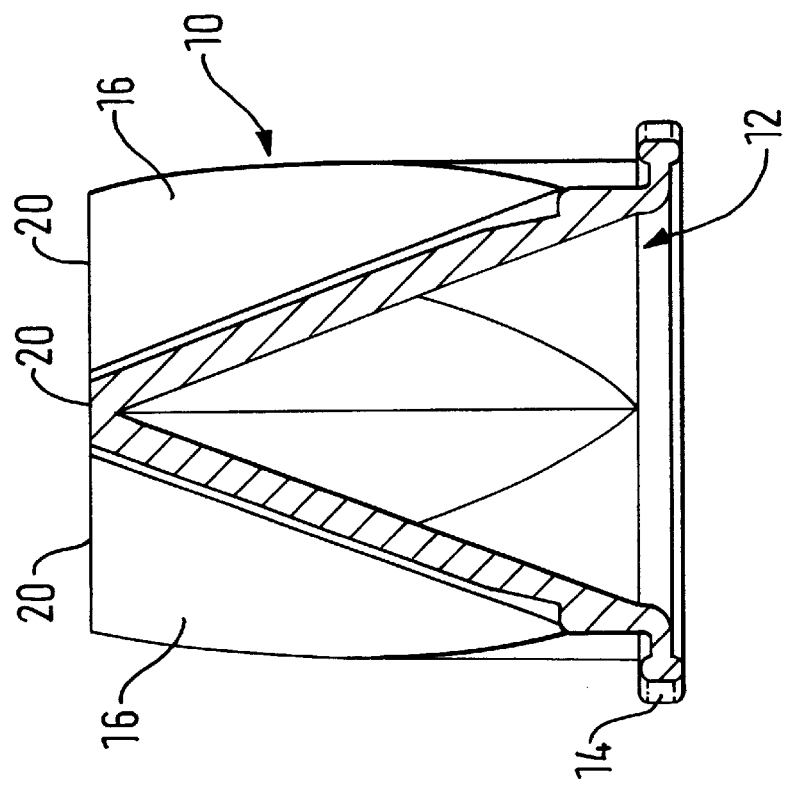
FIG. 4 is a two-part sectional view of the check valve on line IV—IV of FIG. 3.
Figure 3:
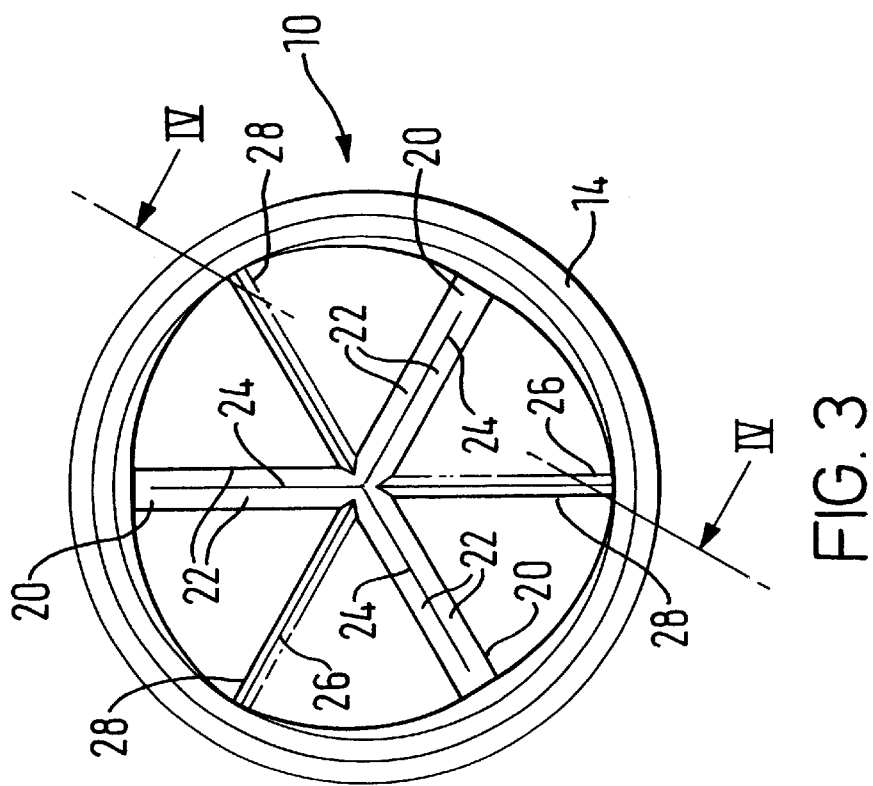
FIG. 3 is a plan view of the check valve.

Referring to the drawings, a check valve comprises a body 10 of elastomeric material having a tubular inlet 12 at a first end with a radial flange 14. The body 10 has a side surround with three equi-spaced valleys 16 tapering together towards a second end opposite to the first end. The remaining land portions 18 of the side surround between the valleys 16 each circumferentially taper towards said second end. The valleys 16 terminate in sealing edges 22 in the form of a triskelion, each arm 20 of which is of same length and having a slit 24 median of its width, the slits 24 uniting together at adjacent ends. The wall thickness of the valley sides is greater than the wall thickness of the side surround. A flexing line 26 is provided by a groove 28 at the bottom of each valley 16. The wall thickness of the bottom of the groove 28 is less than the wall thickness of the valley sides.

In a use of the valve, as described hereinafter, to sustain its shape and remain substantially axially rigid during a siphoning or vacuuming cycle, during which back pressure may reach about 15 psi and regulations may require this to be increased by a factor of 2, the wall thickness or the valleys 16 is greater than the wall thickness of the land portions 18 as above stated. For example, the walls of the valleys 16 may be 2.50 mm compared to the walls of the land portions 18 of 1.70 mm. The thickness of the wall of the valley 16 at the flexing line 26 of the groove 28 may be 1.70 mm.

The hardness of the elastomeric material may be between 80°–90° shore.

Figure 5:
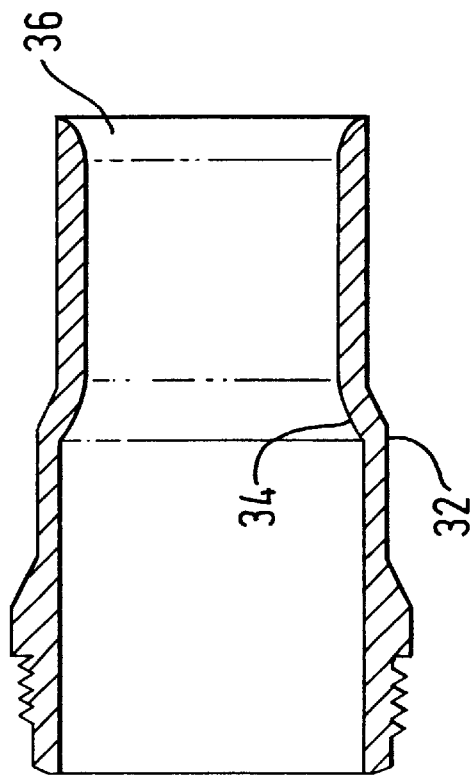
FIG. 5 is an exploded side elevation view of the check valve and a two-part valve housing (shown in cross-section) to which the valve is fitted.
Figure 5:
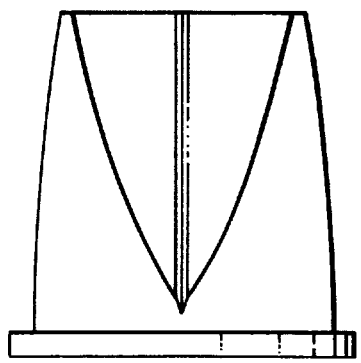
Figure 5:
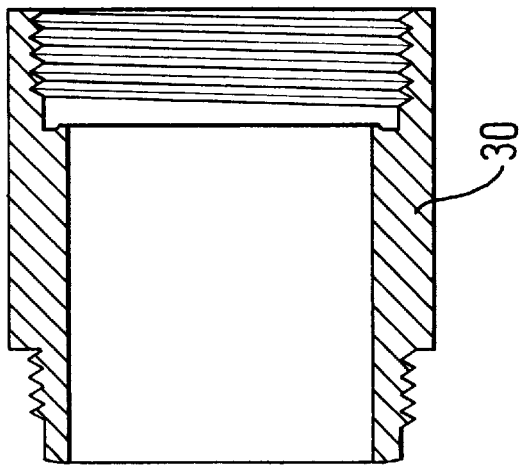

As shown in FIG. 5, one form of a valve housing is in two parts 30, 32, the front side of the flange 14 abutting against the end of part 32 and being clamped to form an airtight and watertight seal when the two parts 30, 32 of the valve housing are screwed together with the rear side of the flange 14 against the inside ring 38 of the pad 30, the second end of the valve extending into the interior of part 32.

The part 32 is provided with reduced diameters and the inside walls thereat are sloped at 34 to induce positive flow. Also, the edge 36 of the part 32 at its outer end is bevelled/champhered as shown.

In use, a check valve and valve housing as shown in FIG. 5 as described above is connected into a pipe of, for example, a toilet assembly. The valve has an openable mouth extending between said sealing edges 22 when opened to allow passage of material through the opening of substantially the same areal dimensions as the tubular inlet 12. The outflow pipe is provided with reduced diameters and the inside walls thereat are sloped to induce a positive flow. The valve housing may have more than one valve seat to allow more than one check valve to be fitted.

Variations and modifications can be made without departing from the scope of the invention described above and as described hereinafter.

I claim:

1. A check valve comprising a body of elastomeric material having a tubular inlet at a first end with a radial flange, the body having a side surrounded with three equi-spaced valleys tapering together towards a second end opposite to the first end and having thereat sides with sealing edges in a form of a triskelion, whereby an openable mouth is extendible between said sealing edges of substantially the same areal dimensions as the tubular inlet, a wall thickness of each of the sides being greater than a wall thickness of the surrounding side.

2. A check valve according to claim 1, wherein each arm of the triskelion is of a same length and has a slit substantially median of a width.

3. A check valve according to claim 2, wherein the slits in the arms unite together at adjacent ends.

4. A check valve according to claim 1, wherein at a bottom of each valley, a groove is positioned to provide a flexing line.

5. A check valve according to claim 4, wherein a wall thickness of a bottom of the groove is less than the wall thickness of the valley sides.

6. A valve housing having at least one check valve having a body of elastomeric material having a tubular inlet at a first end with a radial flange, the body having a side surrounded with three equispaced valleys tapering together towards a second end opposite to the first end and having thereat sides with sealing edges in a form of a triskelion, whereby an openable mouth is extendible between said sealing edges of substantially a same areal dimension as the tubular inlet, a wall thickness of each of the sides being greater than a wall thickness of the surrounding side.

7. A valve housing according to claim 6, wherein each arm of the triskelion is of a same length and has a slit substantially median of a width of each arm.

8. A valve housing according to claim 6, wherein the slits in the arms unite together at adjacent ends.

9. A check valve according to claim 6, wherein at the bottom of each valley, a groove is positioned to provide a flexing line.

10. A check valve according to claim 6, wherein at the bottom of each valley, a groove is positioned to provide a flexing line, and wherein the wall thickness of the bottom of the groove is less than the wall thickness of the valley sides.

11. A check valve comprising a body of elastomeric material having a tubular inlet at a first end with a radial flange, the body having a side surrounded by three equispaced valleys tapering together towards a second end opposite to the first end, said valleys each having sides and sealing edges at the second end and said three valleys forming a triskelion, whereby an openable mouth is extendible between said sealing edges of substantially the same areal dimensions as the tubular inlet, the three valleys being separated from each other by three generally triangularly shaped land portions, wherein the wall thickness of each of the valley sides is greater than the thickness of the triangularly shaped land portions.

12. A check valve according to claim 11, wherein each arm of the triskelion is of same length and has a slit substantially median of its width.

13. A check valve according to claim 12, wherein the slits in the arms unite together at adjacent ends.

14. A check valve according to claim 11, wherein at the bottom of each valley, a groove is positioned to provide a flexing line.

15. A check valve according to claim 14, wherein the thickness of the wall at the bottom of the groove is less than the thickness of the wall at the valley sides.

* * * * *